United States Patent
Mathew et al.

(10) Patent No.: US 9,762,400 B2
(45) Date of Patent: Sep. 12, 2017

(54) STABLE PROBING-RESILIENT PHYSICALLY UNCLONABLE FUNCTION (PUF) CIRCUIT

(71) Applicant: Intel Corporation, Santa Clara, CA (US)

(72) Inventors: Sanu K. Mathew, Hillsboro, OR (US); Sudhir K. Satpathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/335,158

(22) Filed: Oct. 26, 2016

(65) Prior Publication Data

US 2017/0111180 A1    Apr. 20, 2017

Related U.S. Application Data

(63) Continuation of application No. 14/667,665, filed on Mar. 24, 2015, now Pat. No. 9,515,835.

(51) Int. Cl.
*H04L 9/32* (2006.01)
*H03K 19/177* (2006.01)

(52) U.S. Cl.
CPC ..... *H04L 9/3278* (2013.01); *H03K 19/17768* (2013.01)

(58) Field of Classification Search
CPC .. G06F 11/07; G06F 11/0745; G06F 11/0793; H03K 19/17768; H04L 9/3279
See application file for complete search history.

(56) References Cited

U.S. PATENT DOCUMENTS

| 4,634,905 A | 1/1987 | Campbell, Jr. |
| 5,455,931 A | 10/1995 | Camporese et al. |

(Continued)

FOREIGN PATENT DOCUMENTS

| JP | 2005065044 A | 3/2005 |
| WO | 2014127358 A1 | 8/2014 |

(Continued)

OTHER PUBLICATIONS

International Search Report and Written Opinion mailed Jul. 5, 2016 for International Application No. PCT/US2016/017545, 12 pages.

(Continued)

*Primary Examiner* — Don Le
(74) *Attorney, Agent, or Firm* — Schwabe, Williamson & Wyatt, P.C.

(57) ABSTRACT

Embodiments include apparatuses, methods, and systems for a physically unclonable function (PUF) circuit. The PUF circuit may include an array of PUF cells to generate respective PUF bits of an encryption code. Individual PUF cells may include first and second inverters cross-coupled between a bit node and a bit bar node. The individual PUF cells may further include a first pre-charge transistor coupled to the bit node and configured to receive a clock signal via a first clock path, and a second pre-charge transistor coupled to the bit bar node and configured to receive the clock signal via a second clock path. Features and techniques of the PUF cells are disclosed to improve the stability and/or bias strength of the PUF cells, to generate a dark bit mask for the array of PUF cells, and to improve resilience to probing attacks. Other embodiments may be described and claimed.

24 Claims, 6 Drawing Sheets

(56) References Cited

U.S. PATENT DOCUMENTS

| | | |
|---|---|---|
| 5,650,971 A | 7/1997 | Longway et al. |
| 6,462,998 B1 | 10/2002 | Proebsting |
| 6,906,962 B2 | 6/2005 | Layman et al. |
| 7,402,855 B2 | 7/2008 | Kurjanowicz |
| 7,508,694 B2 | 3/2009 | Terzioglu et al. |
| 7,688,648 B2 | 3/2010 | Kim |
| 7,759,970 B2 | 7/2010 | Terzioglu et al. |
| 8,159,260 B1 | 4/2012 | Behrends et al. |
| 8,179,160 B1 | 5/2012 | Chauhan et al. |
| 8,334,715 B1 | 12/2012 | Muthali et al. |
| 8,415,969 B1 | 4/2013 | Ficke et al. |
| 2006/0061388 A1 | 3/2006 | Kuang et al. |
| 2006/0238266 A1 | 10/2006 | Harjani et al. |
| 2008/0250290 A1 | 10/2008 | Bushard et al. |
| 2013/0129083 A1* | 5/2013 | Fujino .................. G11C 7/24 380/29 |
| 2013/0194886 A1* | 8/2013 | Schrijen ................ G06F 7/588 365/226 |
| 2014/0093074 A1 | 4/2014 | Gotze et al. |
| 2014/0232430 A1 | 8/2014 | Cowley et al. |
| 2014/0266297 A1 | 9/2014 | Mathew et al. |
| 2014/0327469 A1* | 11/2014 | Pfeiffer ............... H03K 19/003 326/8 |
| 2015/0058928 A1 | 2/2015 | Guo et al. |
| 2015/0178143 A1 | 6/2015 | Mathew et al. |
| 2016/0182045 A1 | 6/2016 | Mai et al. |
| 2016/0329897 A1* | 11/2016 | Gu ................. H03K 19/017509 |

FOREIGN PATENT DOCUMENTS

| | | |
|---|---|---|
| WO | WO2015027070 A1 | 2/2015 |
| WO | WO2015031683 A1 | 3/2015 |

OTHER PUBLICATIONS

Satpathy, et al., "13fJ/bit probing-resilient 250K PUF array with soft dark bit masking for 1.94% bit-error in 22nm tri-gate CMOS," European Solid State Circuits Conference (ESSCIRC), ESSCIRC 2014—40th; (Sep. 2014), pp. 239-242.

Mathew, et al., "A 0.19 pJ/b PVT-variation-tolerant hybrid physically unclonable function circuit for 100% stable secure key generation in 22nm CMOS," IEEE Int'l Solid-State Circuits Conference Digest of Technical Papers (ISSCC), (Feb. 2014), pp. 278-279.

Y.Su, et al., "A 1.6pJ/bit 96% stable chipID generating circuit using process variations," ISSCC 2007.

Liang et al., "Mitigating the Impact of Process Variations on Processor Register Files and Execution Units", 39th Annual IEEE/ACM International Symposium on Microarchitecture, Dec. 9-13, 2006, 11 pages.

Notice of Allowance mailed Jul. 29, 2016 for U.S. Appl. No. 14/667,665, 19 pages.

* cited by examiner

STABLE PROBING-RESILIENT PHYSICALLY UNCLONABLE FUNCTION (PUF) CIRCUIT

CROSS REFERENCE TO RELATED APPLICATION

This application is a continuation of U.S. patent application Ser. No. 14/667,665, entitled "STABLE PROBING-RESILIENT PHYSICALLY UNCLONABLE FUNCTION (PUF) CIRCUIT," filed on Mar. 24, 2015, and claims priority to the Ser. No. 14/667,665 application. The entire disclosure of the Ser. No. 14/667,665 application is incorporated herein by reference.

FIELD

Embodiments of the present invention relate generally to the technical field of electronic circuits, and more particularly to physically unclonable function (PUF) circuits for generating a secure secret key.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Many electronic circuits, such as computer chips, use encryption keys to authenticate with another device. The encryption key is sometimes programmed by the manufacturer and stored in fuses on the electronic circuit die. However, the fuses are prone to visual and electrical probing attacks. Furthermore, since the fuses are programmed by the manufacturer, they are vulnerable to an insider attack on the test floor.

Some circuits use a physically unclonable function (PUF) circuit to generate an encryption key. The PUF circuit exploits physical variation in devices (e.g., transistors) of the PUF circuit to generate the encryption key. It is important that the PUF circuit generates a stable and repeatable encryption key. Furthermore, for high volume manufacturing of PUF circuits, it is beneficial to have high variation between different units of the PUF circuit.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Figure 1:
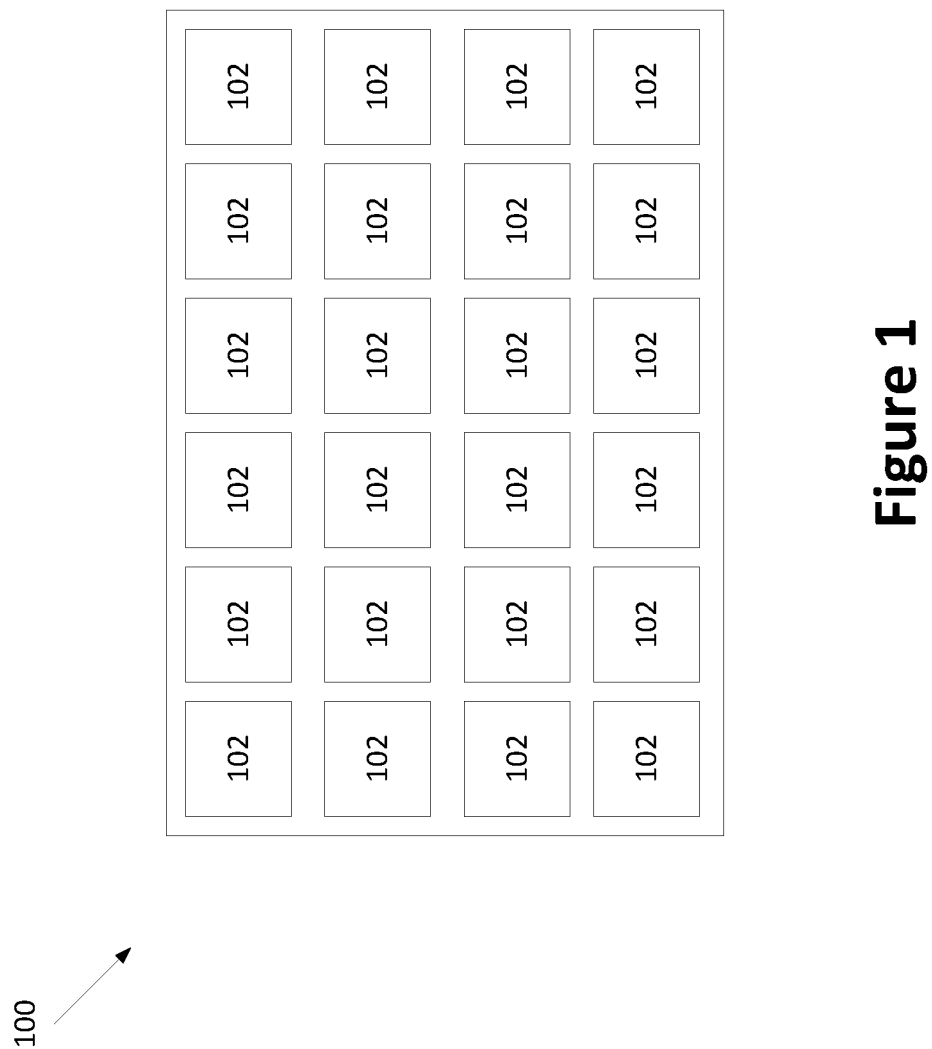
FIG. 1 illustrates a physically unclonable function (PUF) circuit in accordance with various embodiments.

FIG. 1 illustrates a physically unclonable function (PUF) circuit 100 in accordance with various embodiments. The PUF circuit 100 may be included in an integrated circuit, such as a processor, and may be disposed on a same die as other functional blocks of the integrated circuit. The PUF circuit 100 may include a plurality of PUF cells 102. The PUF cells 102 may be for example, the PUF cell 200, the PUF cell 300, and/or the PUF cell 400 shown in FIGS. 2, 3, and 4, respectively, and discussed further below.

Individual PUF cells 102 may generate one or more output bits of an encryption key. For example, in some embodiments, individual PUF cells 102 of the PUF circuit 100 may generate a single output bit of the encryption key. The value of the one or more output bits generated by the PUF cells 102 may depend on physical properties of one or more devices (e.g., transistors) of the PUF cells. For example, different PUF cells 102 may be biased to generate specific values for the output bits based on variation in the devices of the PUF cells 102 that occurs during manufacturing. Accordingly, the PUF circuit 100 may generate a unique encryption key that is associated with the integrated circuit.

Figure 2:
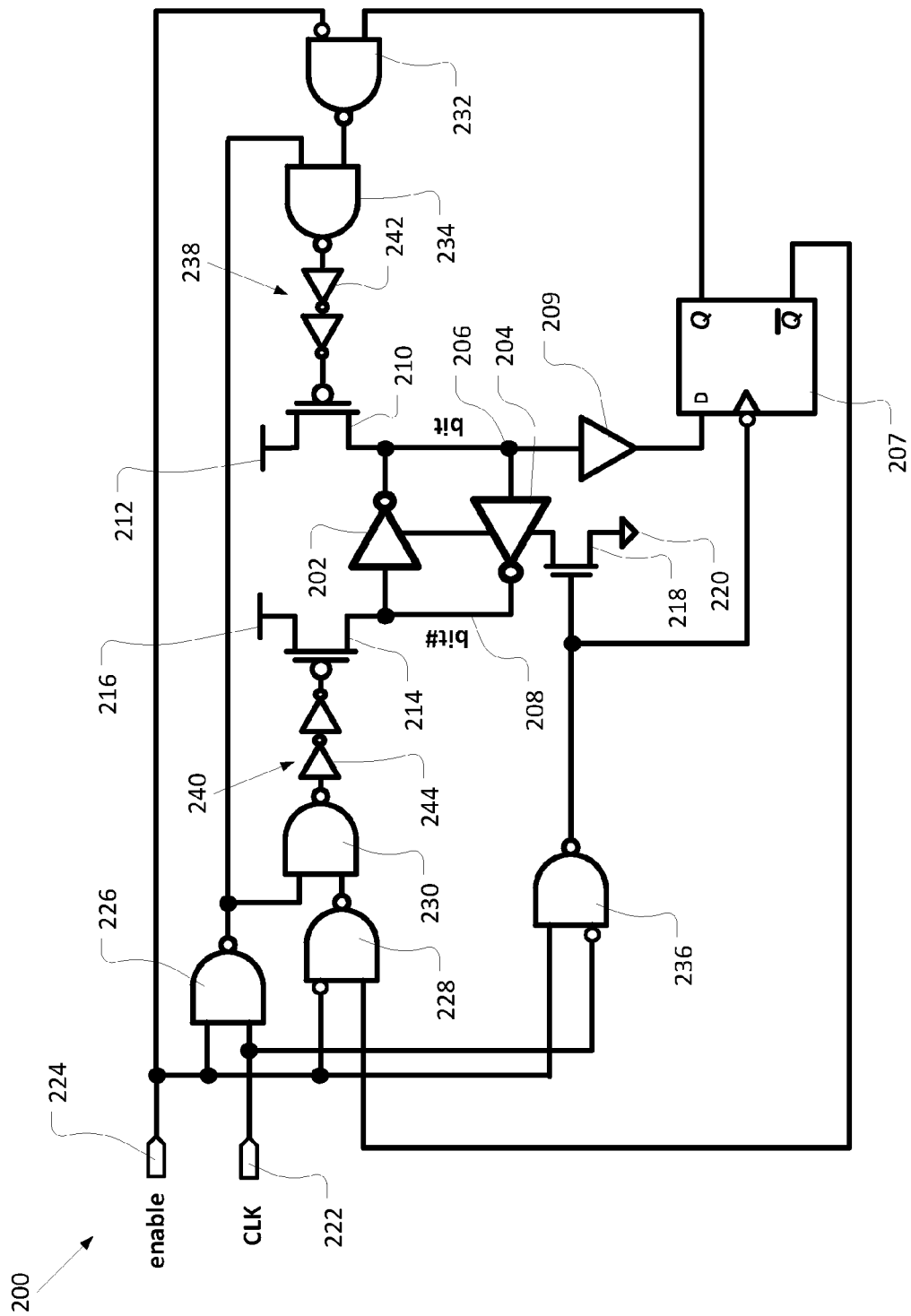
FIG. 2 illustrates a PUF cell in accordance with various embodiments.

FIG. 2 illustrates a PUF cell 200 in accordance with various embodiments. The PUF cell 200, or certain aspects of the PUF cell 200, may be included in one or more of the PUF cells 102 of PUF circuit 100. The PUF cell 200 may include delay hardening features that take advantage of accelerated aging of transistors during burn-in of the PUF cell 200 to further reinforce the bias of the PUF cell 200 to evaluate to one stable state in favor of another stable state (and thereby generate a PUF bit with a consistent value over successive iterations).

In various embodiments, the PUF cell 200 may include inverter 202 and inverter 204 that are cross-coupled with one another between a bit node 206 and a bit bar (bit#) node 208. For example, an input terminal of inverter 202 may be coupled with the bit bar node 208, and an output terminal of inverter 202 may be coupled with the bit node 206. An input terminal of inverter 204 may be coupled with the bit node 206, and an output terminal of inverter 204 may be coupled with the bit bar node 208.

In various embodiments, the bit node 206 may be coupled with a data input terminal (D) of a flip-flop 207 (e.g., via a buffer 209). The flip-flop 207 may further include a trigger input (>), a data output terminal (Q), and a data bar output terminal ($\overline{Q}$). The flip-flop 207 may store a value of the data input signal received at the data input terminal (e.g., the logic value of the bit node 206) when triggered by a trigger signal received at the trigger input. The data output terminal may output the stored value, and the data bar output terminal may output a logical inverse of the stored value.

In various embodiments, the PUF cell 200 may further include a pre-charge transistor 210 coupled with and between the bit node 206 and a power supply terminal 212, and a pre-charge transistor 214 coupled with and between the bit bar node 208 and a power supply terminal 216. In some embodiments, the pre-charge transistors 210 and 214 may be p-type metal-oxide-semiconductor (PMOS) transistors, as shown in FIG. 2. The power supply terminals 212 and 216 may receive a supply voltage. For example, in some embodiments, the power supply terminals 212 and 216 may be coupled to one another to receive the same supply voltage.

In various embodiments, the PUF cell 200 may further include a footer transistor 218 coupled with the inverter 202 and the inverter 204. The footer transistor 218 may be coupled between the inverters 202 and 204 and a ground terminal 220. In some embodiments, the footer transistor 218 may be an n-type metal-oxide-semiconductor (NMOS) transistor, as shown in FIG. 2. The footer transistor 218 may be coupled with NMOS transistors in the cross-coupled inverters 202 and 204. For example, in some embodiments, the inverters 202 and 204 may be complementary metal-oxide-semiconductor (CMOS) inverters, with each inverter 202 and 204 including one NMOS transistor and one PMOS transistor. The source of the footer transistor 218 may be coupled with the drain terminal of the NMOS transistor in the inverter 202 and with the drain terminal of the NMOS transistor in the inverter 204.

In some embodiments, the PUF cell 200 may further include one or more capacitors (not shown) coupled between the bit node 206 and a ground potential and/or one or more capacitors (not shown) coupled between the bit bar node 208 and a ground potential. The capacitors may reduce high frequency noise on the bit node 206 and/or bit bar node 208.

In various embodiments, the PUF cell 200 may receive a clock signal, CLK, at a clock terminal 222, and may receive an enable signal at an enable terminal 224. In various embodiments, the PUF cell 200 may further include negative-AND (NAND) gates 226, 228, 230, 232, 234, and/or 236. The individual NAND gates 226, 228, 230, 232, 234, and/or 236 may include a pair of input terminals and an output terminals coupled as shown. The NAND gates 226, 228, 230, 232, 234, and/or 236 may be included in control circuitry of the PUF cell 200 to control the PUF cell 200 based on the clock signal and the enable signal.

For example, the NAND gate 226 may receive the enable signal and the clock signal at respective input terminals of the NAND gate 226. The NAND gate 228 may receive an inverted version of the enable signal (e.g., enable bar) at a first input terminal of the NAND gate 228, and a second input terminal of the NAND gate 228 may be coupled to the data bar output terminal of the flip-flop 207 to receive the data bar output signal $\overline{Q}$. The NAND gate 232 may receive an inverted version of the enable signal (e.g., enable bar) at a first input terminal of the NAND gate 232, and a second input terminal of the NAND gate 232 may be coupled to the data output terminal of the flip-flop 207 to receive the data output signal Q. The NAND gate 230 may receive the output signals of the NAND gates 226 and 228 at respective input terminals of the NAND gate 230, and the NAND gate 234 may receive the output signals of the NAND gates 226 and 232 at respective input terminals of the NAND gate 234. The NAND gate 236 may receive the enable signal and an inverted version of the clock signal at respective input terminals of the NAND gate 236. An output terminal of the NAND gate 236 may be coupled to the gate terminal of the footer transistor 218 and to the trigger input of the flip-flop 207.

In various embodiments, the PUF cell 200 may further include a delay chain 238 coupled on a first clock path between the clock terminal 222 and the pre-charge transistor 210, and a delay chain 240 coupled on a second clock path between the clock terminal 222 and the pre-charge transistor 214. For example, the delay chain 238 may be coupled between the output terminal of the NAND gate 230 and the gate terminal of the pre-charge transistor 210, and the delay chain 240 may be coupled between the output terminal of the NAND gate 234 and the gate terminal of the pre-charge transistor 214. The delay chain 238 may include one or more inverters 242 coupled in series with one another, and the delay chain 240 may include one or more inverters 244 coupled in series with one another. For example, in some embodiments, the delay chain 238 may include an even number of inverters 242 (e.g., 2 or 4) and/or the delay chain 240 may include an even number of inverters 244. In various embodiments, the delay chains 238 and 240 may provide delay hardening to reinforce the bias of the PUF cell 200, as further discussed below.

In various embodiments, the enable signal may be used to transition the PUF cell 200 between a bit generation mode and a delay hardening mode. For example, the enable signal may have a first value (e.g., logic 1) during the bit generation mode of the PUF cell 200 to enable operation of the PUF cell 200 to generate a PUF bit, and may have a second value (e.g., logic 0) during the delay hardening mode of the PUF cell 200 to provide delay hardening for the PUF cell 200.

In various embodiments, in the bit generation mode, the clock signal may have a first value (e.g., logic 0) during a first portion of a bit generation process, also referred to as a pre-charge portion of the bit generation process. When the clock signal has a value of logic 0, the pre-charge transistors 210 and 214 may turn on responsive to the clock signal (e.g., when the pre-charge transistors 210 and 214 receive the clock signal via the respective clock paths). Accordingly, the pre-charge transistors 210 and 214 may charge the bit node 206 and the bit bar node 208, respectively, to a logic 1 (e.g., to the voltage level of the supply voltage at the power supply terminals 212 and 216). The footer transistor 218 may turn off responsive to the clock signal having a value of logic 0, causing the ground connection of the NMOS transistors in the inverters 202 and 204 to float and thereby allowing both the bit node 206 and the bit bar node 208 to go to a logic 1.

In various embodiments, the clock signal may go to a second logic value (e.g., logic 1) during a second portion of the PUF bit generation process. The pre-charge transistors 210 and 214 may turn off when they receive the clock signal with the value of logic 1. Additionally, the footer transistor 218 may turn on responsive to the clock signal having a value of logic 1. Accordingly, there may be contention between the cross-coupled inverters 202 and 204, causing the bit node 206 to settle to a value of either logic 1 or logic 0 and causing the bit bar node 208 to settle to the logical inverse of the value of the bit node 206. For example, the bit node 206 may remain at a logic 1 and the bit bar node 208 may go to a logic 0, or the bit node 206 may go to a logic 0 and the bit bar node 208 may remain at a logic 1. The value to which the bit node 206 settles may correspond to the value of the PUF bit generated by the PUF cell 200. In various embodiments, the value of the PUF bit may be written to the flip-flop 207.

In various embodiments, the enable signal may go to a logic 0 during the delay hardening mode of the PUF cell 200 to provide delay hardening of the PUF cell 200. The flip-flop may pass the stored value of the PUF bit to the NAND gate 232, and may pass an inverse of the stored value of the PUF bit to the NAND gate 228. During the delay hardening mode (e.g., when the enable signal goes to a logic 0), the NAND gates 232 and 228 may cause the opposite logical value to be written back to the PUF cell 200. For example, if the bit node 206 settled to a logic 0 during the PUF bit generation process, the bit node 206 may be driven to a logic 1 during the delay hardening mode.

In various embodiments, the inverters 242 of delay chain 238 and inverters 244 of delay chain 240 may receive input signals with opposite logic values than the values of the corresponding input signals when the PUF cell 200 has settled during the second portion of the PUF bit generation process. Additionally, transistors (e.g., the transistors of inverters 242 and inverters 244) may degrade significantly more when they are on than when they are off, causing transistors that are on more to slow down relative to transistors that are off more. Accordingly, writing the opposite logic value into the PUF cell 200 during the delay hardening mode may cause the delay chain in the clock path of the node that evaluates to a logic 1 to exhibit a slow down in a 0-to-1 transition that is propagated through the delay chain, and causes the delay chain in the clock path of the node that evaluates to a logic 0 to exhibit a speed up in a 0-to-1 transition that is propagated through the delay chain.

For example, if the bit node 206 evaluates to a logic 0 during the PUF bit generation process, the propagation of a 0-to-1 transition in delay chain 238 may speed up during the delay hardening process relative to the propagation of a 1-to-0 transition in the delay chain 238. Additionally, the propagation of a 0-to-1 transition in the delay chain 240 may slow down during the delay hardening process relative to the propagation of a 1-to-0 transition. The slow down in the 0-to-1 transition in the delay chain 240 may cause the pre-charge transistor 214 to receive the 0-to-1 transition in the clock signal later than the pre-charge transistor 210. This increases the bias of the PUF cell 200 that causes the bit node 206 to settle to a logic 0 and the bit bar node 208 to settle to a logic 1 during the PUF bit generation process.

In various embodiments, the PUF cell 200 may be placed in the delay hardening mode during a burn-in process. The burn-in process may be used to break in an integrated circuit that includes the PUF cell 200 after manufacturing and prior to being put into normal use. Additionally, or alternatively, the PUF cell 200 may be placed in the delay hardening mode during normal use of the integrated circuit, between times when the encryption code is generated. Accordingly, the differential delay in the clock paths may be maintained after burn-in and over the life of the PUF cell 200.

Figure 3:
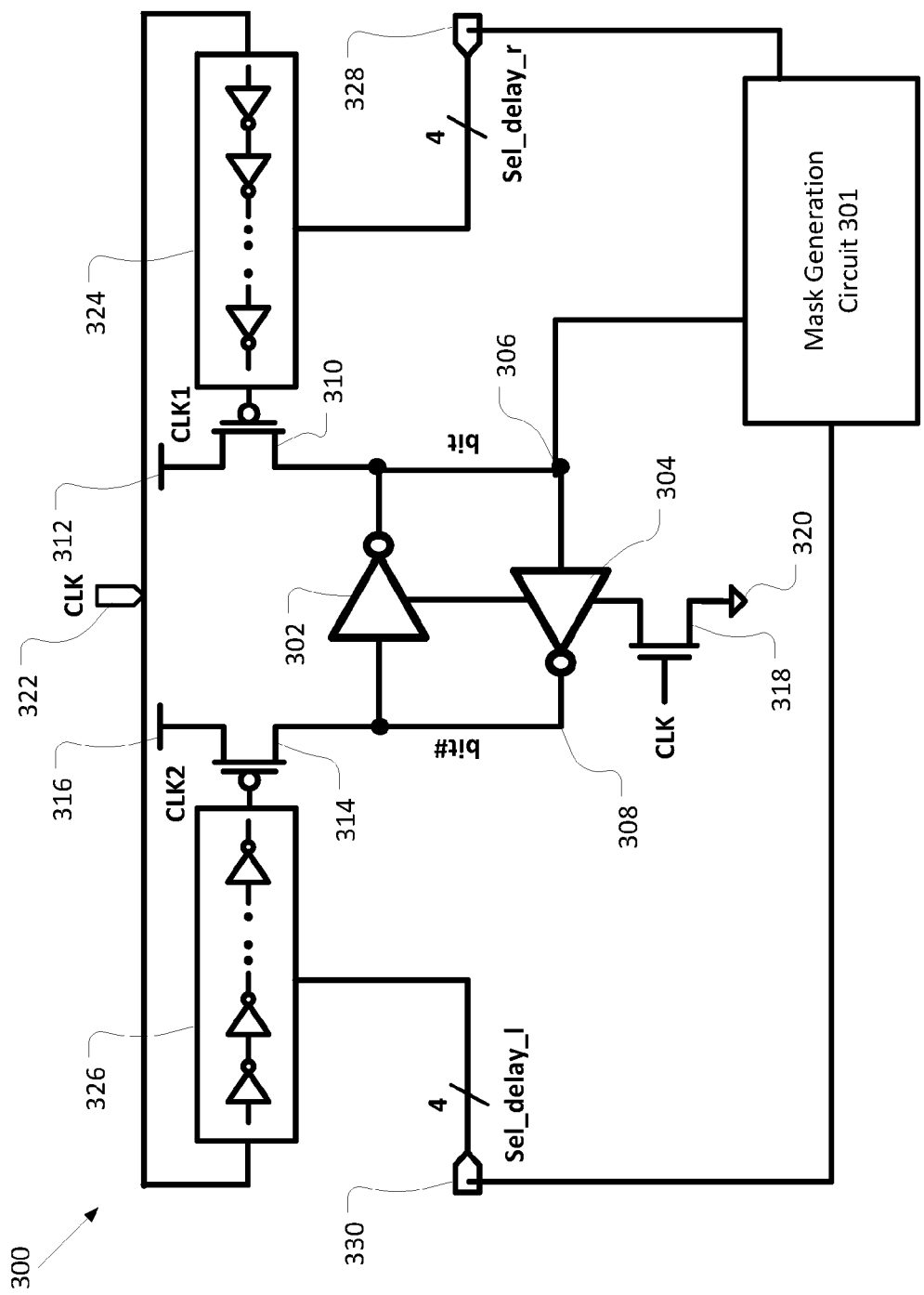
FIG. 3 illustrates another PUF cell in accordance with various embodiments.

FIG. 3 illustrates a PUF cell 300 in accordance with various embodiments. The PUF cell 300, or certain aspects of the PUF cell 300, may be included in one or more of the PUF cells 102 of PUF circuit 100. In various embodiments, the PUF cell 300 may be coupled to a mask generation circuit 301. The mask generation circuit 301 may identify PUF cells 300, of an array of PUF cells 300, that are not strongly biased enough to consistently generate a PUF bit with a logic 1 or a logic 0. The mask generation circuit 301 may mark the identified bits as "dark bits" to generate a dark bit mask. The dark bits may be set to a pre-determined value in the encryption code. For example, the PUF cell 300 corresponding to a dark bit may be forced to the pre-determined value when generating the encryption code or the PUF cell 300 may not be used during generation of the encryption code.

In various embodiments, similar to PUF cell 200, PUF cell 300 may include inverter 302 and inverter 304 that are cross-coupled with one another between a bit node 306 and a bit bar (bit#) node 308. For example, an input terminal of inverter 302 may be coupled with the bit bar node 308, and an output terminal of inverter 302 may be coupled with the bit node 306. An input terminal of inverter 304 may be coupled with the bit node 306, and an output terminal of inverter 304 may be coupled with the bit bar node 308.

In various embodiments, the PUF cell 300 may further include a pre-charge transistor 310 coupled with and between the bit node 306 and a power supply terminal 312, and a pre-charge transistor 314 coupled with and between the bit bar node 308 and a power supply terminal 316. The power supply terminals 312 and 316 may receive a supply voltage. For example, in some embodiments, the power supply terminals 312 and 316 may be coupled to one another to receive the same supply voltage.

In various embodiments, the PUF cell 300 may further include a footer transistor 318 coupled with the inverter 302 and the inverter 304. The footer transistor 318 may be coupled between the inverters 302 and 304 and a ground terminal 320. The footer transistor 318 may be coupled with NMOS transistors in the cross-coupled inverters 302 and 304. For example, in some embodiments, the source of the footer transistor 318 may be coupled with the drain terminal of the NMOS transistor in the inverter 302 and with the drain terminal of the NMOS transistor in the inverter 304.

In some embodiments, the PUF cell 300 may further include one or more capacitors (not shown) coupled between the bit node 306 and a ground potential and/or one or more capacitors (not shown) coupled between the bit bar node 308 and a ground potential. The capacitors may reduce high frequency noise on the bit node 306 and/or bit bar node 308.

In various embodiments, the PUF cell 300 may receive a clock signal, CLK, at a clock terminal 322. The clock signal may be passed to the gate terminals of the pre-charge transistors 310 and 314 via respective clock paths. In various embodiments, the PUF cell 300 may include a first programmable delay cell 324 coupled between the pre-charge transistor 310 and the clock terminal 322 and a second programmable delay cell 326 coupled between the pre-charge transistor 314 and the clock terminal 322. The first programmable delay cell 324 may receive a first control signal at a first control terminal 328 and the second programmable delay cell 326 may receive a second control signal at a second control terminal 330. The first and second control signals may be provided, for example, by the mask generation circuit 301.

In various embodiments, the programmable delay cells 324 and 326 may delay the clock signal and pass the delayed version of the clock signal (e.g., CLK1 and CLK 2, respectively) to the respective pre-charge transistor 310 or 314. The amount of delay provided by the programmable delay cells 324 and 326 may be based on the respective control signal. For example, in some embodiments, the first and second control signals may include a plurality of bits. Additionally, the programmable delay cells 324 and 326 may include a plurality of programmable delay elements (e.g. inverters or buffers). The programmable delay elements may be selectively included or not included in the clock path based on the value of the respective control signal. For example, in some embodiments, the control signal may use a thermometer code scheme to control the delay elements of the respective programmable delay cell 324 or 326.

In one non-limiting example, the programmable delay cells 324 and 326 may each include 24 programmable delay elements, and the first and second control signals may each include 4 bits. The 24 programmable delay elements may be controlled as a thermometer code to inject about 0 to about 20 picoseconds of delay with 1 picosecond of granularity.

In various embodiments, the mask generation circuit 301 may adjust the delay provided by the first programmable delay cell and/or the second programmable delay cell to determine a bias strength of the PUF cell 300. For example, the mask generation circuit 301 may control the programmable delay cells 324 and 326 to provide different amounts of relative delay between the first clock signal CLK1 and the second clock signal CLK2, and may determine the value of the output bits generated by the PUF cell 300 for each amount of relative delay. In some embodiments, the mask generation circuit 301 may sweep through values of the first control code while holding the value of the second control code constant, and may sweep through values of the second control code while holding the value of the first control code constant.

In some embodiments, the mask generation circuit 301 may determine the value of the PUF bit generated by the PUF cell 300 when the programmable delay cells 324 and 326 do not introduce any differential delay (e.g., when both the programmable delay cells 324 and 326 are set to provide the same delay, such as 0 delay). The mask generation circuit 301 may also determine the lowest amount of differential delay that causes the PUF cell 300 to generate a PUF bit with a different value than the PUF bit generated with no differential delay. This amount may correspond to the bias strength of the PUF cell 300. For example, the PUF cell 300 may generate a PUF bit of 0 with no differential delay, but may generate a PUF bit of 1 when the first clock signal CLK1 is delayed by 3 picoseconds or more than the second clock signal CLK2.

In various embodiments, the mask generation circuit 301 may identify PUF cells 300 that have a bias strength (e.g., in either direction) that is less than a threshold. The threshold may be any suitable value. For example, in some embodiments, the threshold may be 2 or 3 picoseconds. The mask generation circuit 301 may mark the identified PUF cells 300 as dark bits, thereby generating a dark bit mask.

In some embodiments, the dark bits may be set to a pre-determined value in the encryption code. For example, the PUF cell 300 corresponding to a dark bit may be forced to the pre-determined value when generating the encryption code or the PUF cell 300 may not be used during generation of the encryption code.

Simulations performed on the PUF cell 300 at 0.9 Volts, 50° C., TTTT found that 17% of PUF cells have less than 2 picoseconds of bias, 33% of PUF cells have 2-6 picoseconds of bias, and 50% of PUF cells have 7 picoseconds of bias or more. The PUF cells with a bias of 2 picoseconds or less are weakly biased and the most likely to go unstable (e.g., generate inconsistent values of the PUF bit) in the presence of process, voltage, and/or temperature (PVT) variation. Accordingly, the generation of the dark bit mask described herein may significantly increase stability (e.g., consistent generation of the encryption key) by the array of PUF cells 300.

In various embodiments, the mask generation circuit 301 may generate the dark bit mask when generation of the encryption code is triggered (e.g., at run-time of the integrated circuit that includes the PUF cell 300). For example, the mask generation circuit 301 may generate the dark bit mask every time the encryption code is generated. Accordingly, the mask generation circuit 301 may generate a dark bit mask that adjusts to changes in the PUF cells 300.

Figure 4:
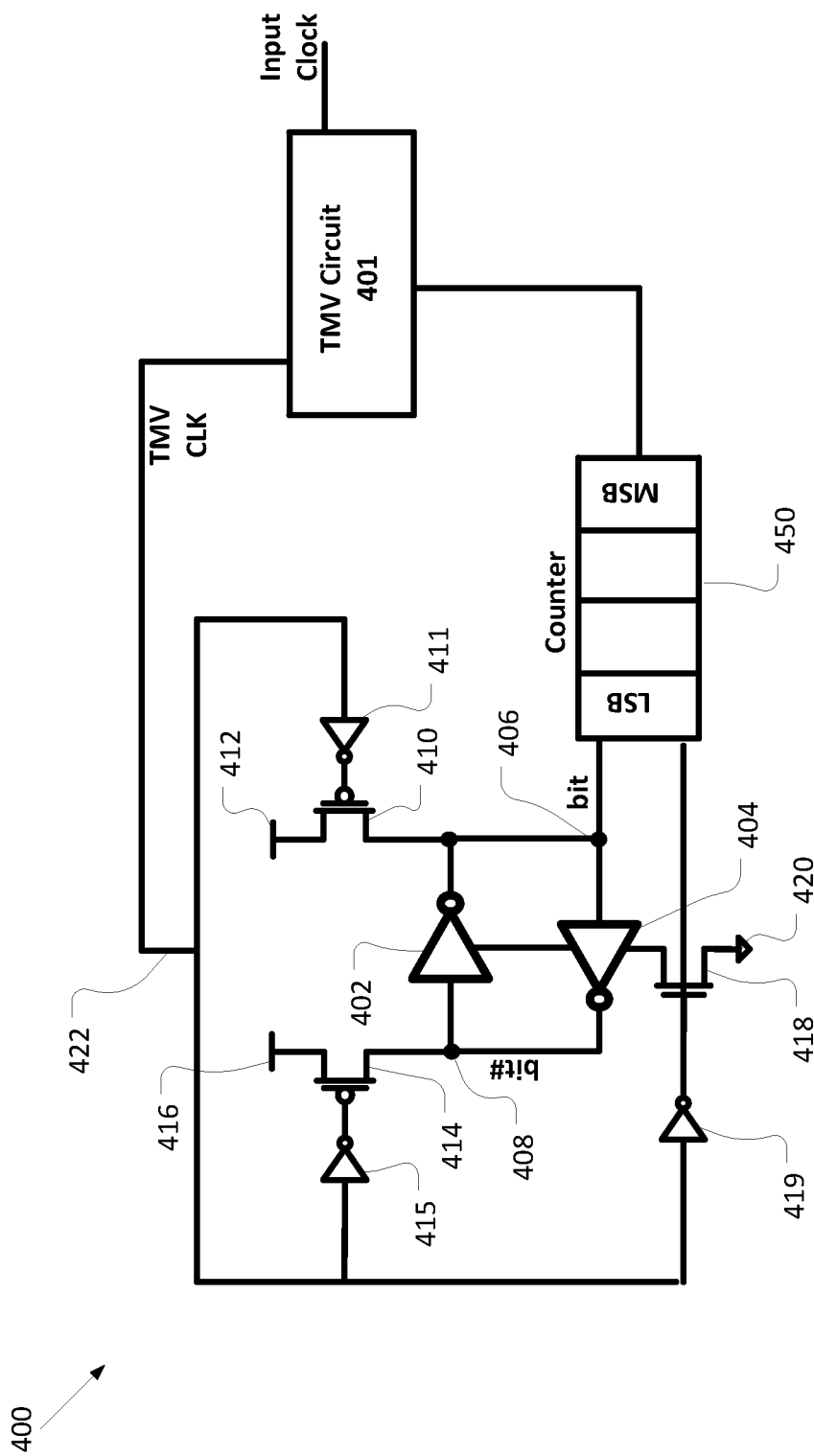
FIG. 4 illustrates another PUF cell in accordance with various embodiments.

FIG. 4 illustrates another PUF cell 400 in accordance with various embodiments. The PUF cell 400, or certain aspects of the PUF cell 400, may be included in one or more of the PUF cells 102 of PUF circuit 100. In various embodiments, as further discussed below, temporal majority voting may be used to determine the value of the PUF bit generated by the PUF cell 400 and/or to determine whether the PUF cell 400 is to be marked as a dark bit.

In various embodiments, PUF cell 400 may include inverter 402 and inverter 404 that are cross-coupled with one another between a bit node 406 and a bit bar (bit#) node 408. For example, an input terminal of inverter 402 may be coupled with the bit bar node 408, and an output terminal of inverter 402 may be coupled with the bit node 406. An input terminal of inverter 404 may be coupled with the bit node 406, and an output terminal of inverter 404 may be coupled with the bit bar node 408.

In various embodiments, the PUF cell 400 may further include a pre-charge transistor 410 coupled with and between the bit node 406 and a power supply terminal 412, and a pre-charge transistor 414 coupled with and between the bit bar node 408 and a power supply terminal 416. The power supply terminals 412 and 416 may receive a supply voltage. For example, in some embodiments, the power supply terminals 412 and 416 may be coupled to one another to receive the same supply voltage.

In various embodiments, the PUF cell 400 may further include a footer transistor 418 coupled with the inverter 402 and the inverter 404. The footer transistor 418 may be coupled between the inverters 402 and 404 and a ground terminal 420. The footer transistor 418 may be coupled with NMOS transistors in the cross-coupled inverters 402 and 404. For example, in some embodiments, the source of the footer transistor 418 may be coupled with the drain terminal of the NMOS transistor in the inverter 402 and with the drain terminal of the NMOS transistor in the inverter 404.

In some embodiments, the PUF cell 400 may further include one or more capacitors (not shown) coupled between the bit node 406 and a ground potential and/or one or more capacitors (not shown) coupled between the bit bar node 408 and a ground potential. The capacitors may reduce high frequency noise on the bit node 406 and/or bit bar node 408.

In various embodiments, the PUF cell 400 may receive a clock signal, TMV CLK, at a clock terminal 422. The clock signal may be passed to the gate terminals of the pre-charge transistors 410 and 414 via respective clock paths (e.g., via inverters 411 and 415, respectively). In some embodiments, the clock signal may be passed to the pre-charge transistors 410 and 414 via respective inverters 411 and 415. Additionally, the footer transistor 418 may receive the clock signal (e.g., via an inverter 419).

In various embodiments, during a first portion of a bit generation process, the clock signal may go to a first value (e.g., logic 1 in PUF cell 400 as shown) to turn on the pre-charge transistors 410 and 414 and turn off the footer transistor 418. Accordingly, the bit node 406 and bit bar node 408 may both be charged to a logic 1. During a second portion of the bit generation process, the clock signal may go to a second value (e.g., logic 0 in PUF cell 400 as shown) to turn off the pre-charge transistors 410 and 414 and turn on the footer transistor 418. During the second portion of the bit generation process, the inverters 402 and 404 may contend with one another, thereby causing either bit node 406 or bit bar node 408 to go to a logic 0 while the other node remains at logic 1. The value of the bit node 406 after the second portion of the bit generation process corresponds to the value of the output bit generated by the bit generation process.

In various embodiments, to generate one PUF bit, the PUF cell 400 may perform the bit generation process multiple times. For example, the clock signal may include a series of pulses to trigger multiple iterations of the bit generation process. In various embodiments, a counter 450 may be coupled to the bit node 406 to count the number of times that the PUF cell 400 generates an output bit of a first logic value (e.g., logic 1) over the number of iterations of the bit generation process. In some embodiments, each PUF cell 400 may be coupled to a separate counter 450. In other embodiments, the counter 450 may be coupled to multiple PUF cells 400.

In some embodiments, a temporal majority voting (TMV) circuit 401 may be coupled to the counter 450. In some embodiments, the TMV circuit 401 may determine the value of the PUF bit associated with the PUF cell 400 based on the counter value. For example, in some embodiments, the TMV circuit 401 may determine that the PUF bit is a first logic value (e.g., logic 1) if the counter value is above a threshold, and may determine that the PUF bit is a second logic value (e.g., logic 0) if the counter value is below the threshold. In some embodiments, the TMV circuit 401 may also provide the clock signal (e.g., TMV CLK) to the PUF cell 400 to trigger the instances of the bit generation process.

In one non-limiting example, the clock signal may include 15 clock pulses that cause the PUF cell 400 to perform 15 instances of the bit generation process. The counter 450 may count the number of the instances for which the PUF cell 400 generates an output bit with a value of logic 1. If the number of instances is 8 or more, the value of the PUF bit associated with the PUF cell 400 may be logic 1, and if the number of instances is 7 or less, the value of the PUF bit associated with the PUF cell 400 may be logic 0. For example, the counter 450 may be a 4-bit counter, and the value of the most significant bit of the counter 450 may be used as the value of the PUF bit associated with the PUF cell 400.

In other embodiments, the PUF cell 400 may perform any suitable number of instances of the bit generation process to generate a PUF bit for an encryption code. For example, in some embodiments, 3, 5, 7, 9, or 31 instances of the bit generation process may be performed.

Additionally, or alternatively, the TMV circuit 401 may determine whether to mark the PUF cell 400 as a dark bit based on the counter value. For example, the TMV circuit 401 may determine that the value of the PUF bit associated with the PUF cell 400 is a first value (e.g., logic 1) if the counter value is above a first threshold, and may determine that the value of the PUF bit associated with the PUF cell 400 is a second value (e.g., logic 0) if the counter value is below a second threshold that is less than the first threshold. If the counter value is between the first and second thresholds, the TMV circuit 401 may determine that the PUF cell 400 is a dark bit.

In various embodiments, the TMV circuit 401 may generate a dark bit mask to indicate which PUF cells 400 of an array of PUF cells 400 are dark bits. In some embodiments, the dark bits may be set to a pre-determined value in the encryption code. For example, the PUF cell 400 corresponding to a dark bit may be forced to the pre-determined value when generating the encryption code or the PUF cell 400 may not be used during generation of the encryption code.

In some embodiments, a PUF cell may include a combination of one or more aspects of the PUF cells 200, 300, and/or 400. For example, the delay chains 238 and 240 of PUF cell 200 may be programmable delay chains similar to the programmable delay cells 324 and 326 of PUF cell 300. Additionally, or alternatively, the PUF cells 200 and/or 300 may use temporal majority voting as described with respect to PUF cell 400.

Figure 5:
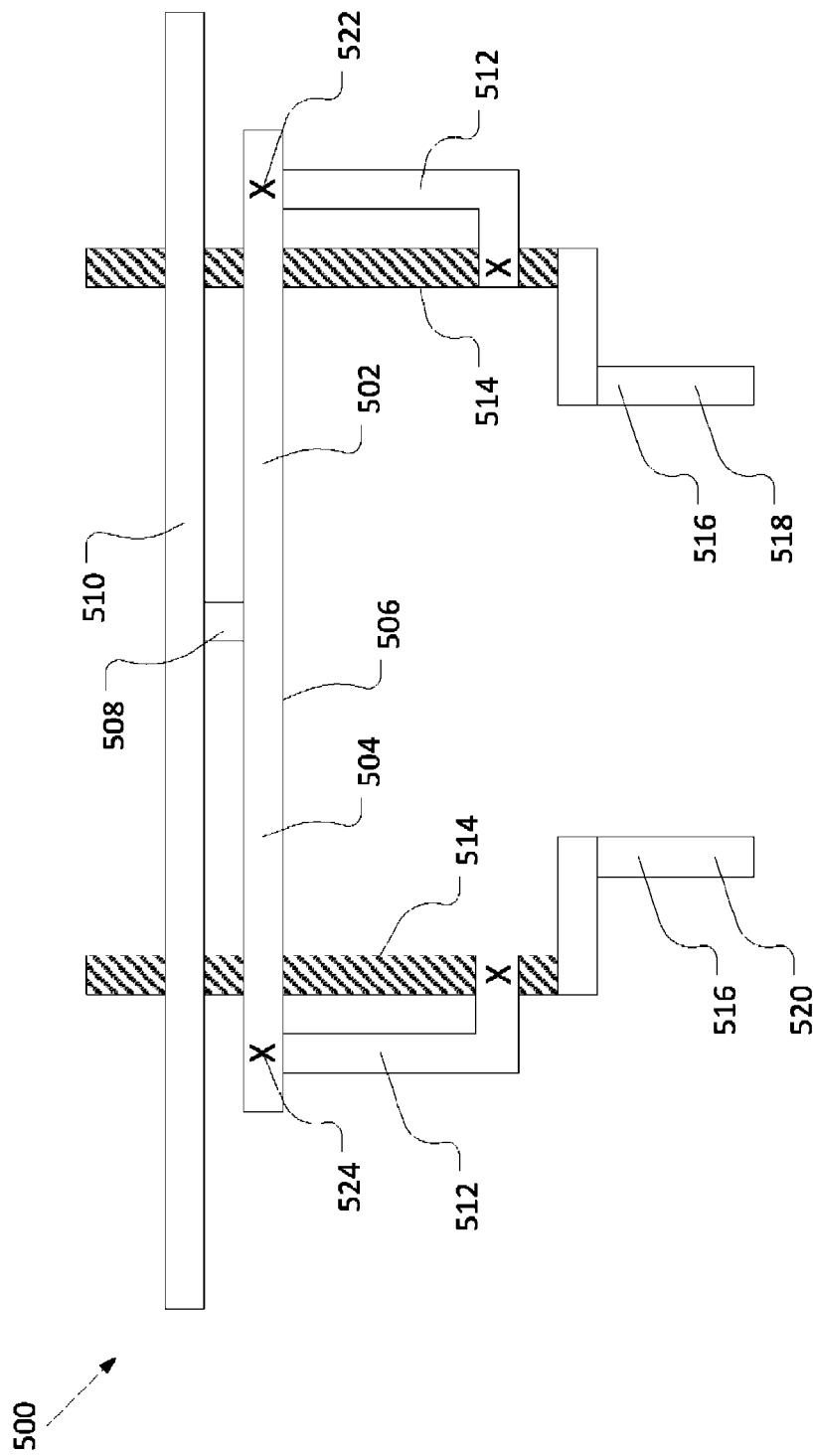
FIG. 5 illustrates a circuit layout for a PUF cell in accordance with various embodiments.

FIG. 5 illustrates a top schematic view of a circuit layout 500 (hereinafter "layout 500") in accordance with various embodiments The layout 500 may be used for an integrated circuit die including the PUF cells described herein, such as PUF cells 102, 200, 300, and/or 400.

In various embodiments, the layout 500 may include various layers that form parts of the PUF cell. The layers may be formed on a substrate. As described herein, a first layer that is described as being above a second layer is further from the substrate than the second layer. For example, the first layer may be formed on top of the second layer, sometimes with one or more layers disposed in between the first and second layers.

In various embodiments, the layout 500 may include a first clock path 502 and a second clock path 504 that include metal in a metal layer 506. The metal layer 506 is coupled a clock terminal 508 to receive the clock signal (e.g., from a clock line 510). In some embodiments, the first and second clock paths may include metal in one or more other metal layers, such as metal layer 512, that are lower than the metal layer 506 (e.g., the metal layer 506 may be disposed in a plane of the layout 500 above a plane in which the metal layer 502 is disposed).

In various embodiments, the layout 500 may further include a poly layer 514 that forms the gates of one or more transistors of the PUF cell (e.g., the pre-charge transistors and/or the transistors in the cross-coupled inverters). The poly layer 514 may be disposed below the metal layer 506. The clock paths 502 and 504 may be coupled to respective portions of the poly layer 514 to pass the clock signal to the respective pre-charge transistors.

In various embodiments, the layout 500 may further include a metal layer 516 that forms the bit node 518 and/or the bit bar node 520. The metal layer 516 may be below the metal layer 506.

In various embodiments, the first clock path 502 and second clock path 504 may be symmetrical with one another (e.g., with respect to a vertical reference plane through the clock terminal 510). For example, the clock terminal 510 may connect to the metal layer 506 at a midpoint between a node 522 at which the metal layer 506 connects to the metal layer 512 on the first clock path 502 and a node 524 at which the metal layer 506 connects to the metal layer 512 on the second clock path 504. The first clock path 502 and the second clock path 506 may have a same path length to carry the clock signal from the clock terminal 510 to the respective portion of the poly layer 514. Accordingly, the symmetrical clock paths 502 and 504 may not introduce any differential delay in the clock signal due to different path lengths, and any difference in the propagation time of the clock signal through the PUF cell may be due to differences in the transistors, as described herein.

Furthermore, since the metal layer 516 that forms the bit node 518 and/or bit bar node 520 is below the metal layer 506 that forms the clock paths 502 and 504, the metal layer 506 would be removed and/or destroyed by any probing attack that is performed to gain access to the bit node 518 and/or bit bar node 520, thus rendering the PUF cell non-functional. Furthermore, if the attacker applied a probing clock to operate the PUF cell, the probing clock would not have symmetrical clock paths to the bit node 518 and bit bar node 520. For example, the probing clock would have different path lengths or would introduce differential resistance, capacitance, or other effects between the clock paths. Accordingly, the PUF cells would not generate the same encryption code in a probing attack, thus rendering the attack unsuccessful. Therefore, the layout 500 may protect the PUF cells from probing attacks.

Figure 6:
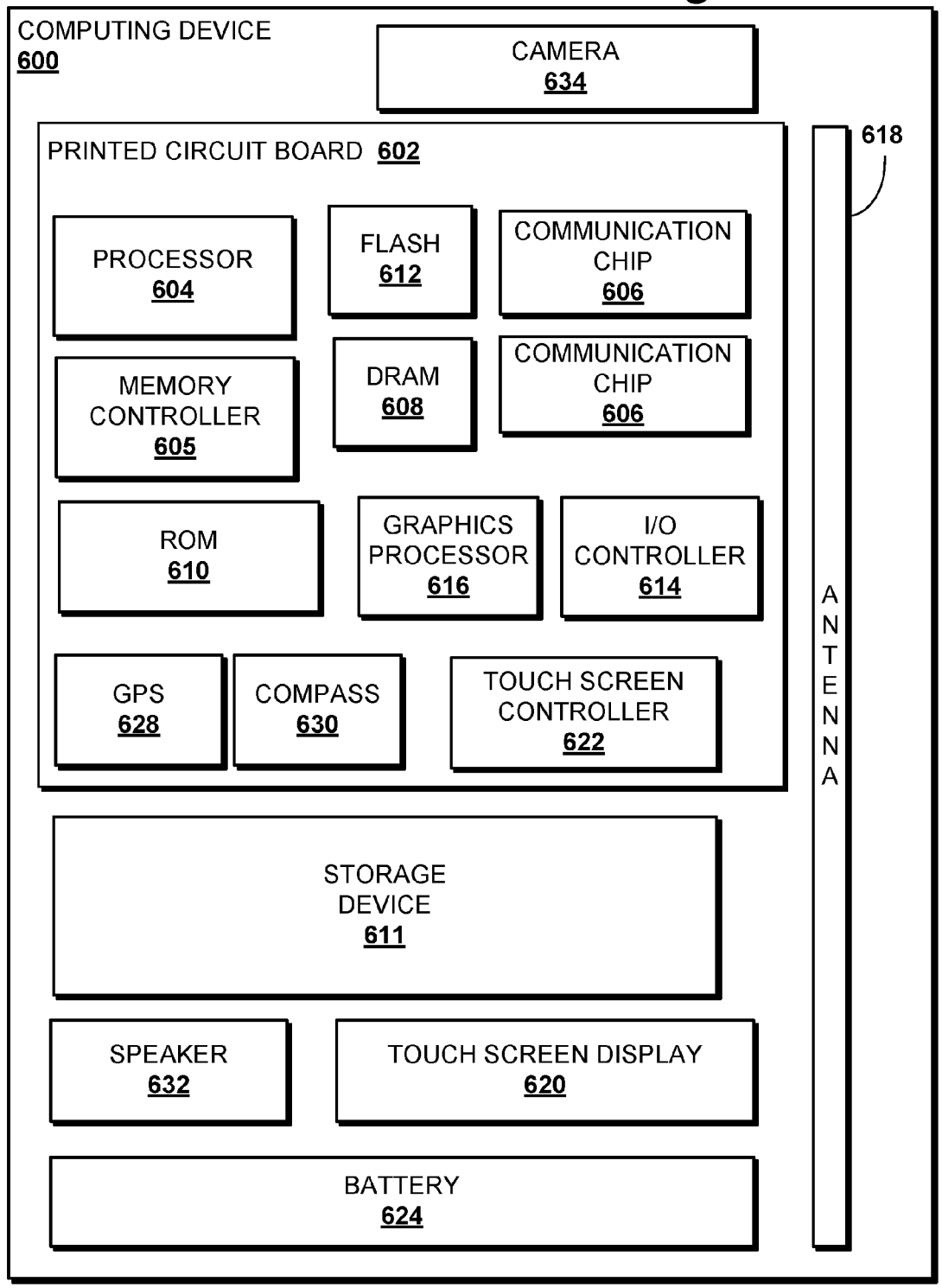
FIG. 6 illustrates an example system configured to employ the apparatuses and methods described herein, in accordance with various embodiments.

FIG. 6 illustrates an example computing device 600 that may employ the apparatuses and/or methods described herein (e.g., PUF circuit 100, PUF cell 200, PUF cell 300, PUF cell 400, layout 500), in accordance with various embodiments. As shown, computing device 600 may include a number of components, such as one or more processor(s) 604 (one shown) and at least one communication chip 606. In various embodiments, the one or more processor(s) 604 each may include one or more processor cores. In various embodiments, the at least one communication chip 606 may be physically and electrically coupled to the one or more processor(s) 604. In further implementations, the communication chip 606 may be part of the one or more processor(s) 604. In various embodiments, computing device 600 may include printed circuit board (PCB) 602. For these embodiments, the one or more processor(s) 604 and communication chip 606 may be disposed thereon. In alternate embodiments, the various components may be coupled without the employment of PCB 602.

Depending on its applications, computing device 600 may include other components that may or may not be physically and electrically coupled to the PCB 602. These other components include, but are not limited to, memory controller 605, volatile memory (e.g., dynamic random access memory (DRAM) 608), non-volatile memory such as read only memory (ROM) 610, flash memory 612, storage device 611 (e.g., a hard-disk drive (HDD)), an I/O controller 614, a digital signal processor (not shown), a crypto processor (not shown), a graphics processor 616, one or more antenna 618, a display (not shown), a touch screen display 620, a touch screen controller 622, a battery 624, an audio codec (not shown), a video codec (not shown), a global positioning system (GPS) device 628, a compass 630, an accelerometer (not shown), a gyroscope (not shown), a speaker 632, a camera 634, and a mass storage device (such as hard disk drive, a solid state drive, compact disk (CD), digital versatile disk (DVD)) (not shown), and so forth. In various embodiments, the processor 604 may be integrated on the same die with other components to form a System on Chip (SoC).

In some embodiments, the one or more processor(s) 604, flash memory 612, and/or storage device 611 may include associated firmware (not shown) storing programming instructions configured to enable computing device 600, in response to execution of the programming instructions by one or more processor(s) 604, to practice all or selected aspects of the methods described herein. In various embodiments, these aspects may additionally or alternatively be implemented using hardware separate from the one or more processor(s) 604, flash memory 612, or storage device 611.

In various embodiments, one or more components of the computing device 600 may include the PUF circuit 100, PUF cell 200, PUF cell 300, PUF cell 400, and/or layout 500 described herein. For example, the PUF circuit 100, PUF cell 200, PUF cell 300, PUF cell 400, and/or layout 500 may be included in processor 604, communication chip 606, I/O controller 614, memory controller 605, and/or another component of computing device 600. The PUF circuit 100, PUF cell 200, PUF cell 300, PUF cell 400, and/or layout 500 may be used to generate an encryption code as described herein. The encryption code may be used to authenticate the computing device 600 with another device and/or to authenticate a component of the computing device 600 with another component of the computing device 600.

The communication chips 606 may enable wired and/or wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth, and a second communication chip

606 may be dedicated to longer range wireless communications such as GPS, EDGE, GPRS, CDMA, WiMAX, LTE, Ev-DO, and others.

In various implementations, the computing device 600 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 600 may be any other electronic device that processes data.

Some non-limiting Examples are provided below.

Example 1 is a physically unclonable function (PUF) circuit comprising: a bit node and a bit bar node; a first inverter and a second inverter that are cross-coupled between the bit node and the bit bar node; a first pre-charge transistor coupled between the bit node and a power supply rail; a second pre-charge transistor coupled between the bit bar node and the power supply rail, the first and second pre-charge transistors to receive a clock signal via respective first and second clock paths; a first delay chain disposed on the first clock path; a second delay chain disposed on the second clock path; and control circuitry. The control circuitry is to: pass the clock signal to the first and second pre-charge transistors during a bit generation mode to generate a PUF bit at the bit node with a first value; and write a second value to the bit node during a delay hardening mode, the second value being a logical inverse of the first value to provide a differential delay in the first and second clock paths.

Example 2 is the PUF circuit of Example 1, further comprising a flip-flop coupled to the bit node to store the first value of the PUF bit, wherein an output terminal of the flip-flop is coupled to the control circuitry.

Example 3 is the PUF circuit of Example 2, further comprising a clock terminal to receive the clock signal and an enable terminal to receive an enable signal to switch the PUF circuit between the bit generation mode and the delay hardening mode.

Example 4 is the PUF circuit of Example 3, wherein the control circuitry includes: a first negative-AND (NAND) gate having a first input terminal coupled to the clock terminal to receive the clock signal, a second input terminal coupled to the enable terminal to receive the enable signal, and an output terminal; a second NAND gate having a first input terminal coupled to receive an inverse of the enable signal, a second input terminal coupled to an output terminal of the flip-flop to receive an output signal, and an output terminal; and a third NAND gate having a first input terminal coupled to the output terminal of the first NAND gate, a second input terminal coupled to the output terminal of the second NAND gate, and an output terminal coupled to the first delay chain.

Example 5 is the PUF circuit of Example 4, further comprising: a fourth NAND gate having a first input terminal coupled to receive an inverse of the enable signal, a second input terminal coupled to an output bar terminal of the flip-flop to receive an output bar signal, and an output terminal; and a fifth NAND gate having a first input terminal coupled to the output terminal of the first NAND gate, a second input terminal coupled to the output terminal of the fourth NAND gate, and an output terminal coupled to the second delay chain.

Example 6 is the PUF circuit of Example 1, further comprising: a footer transistor coupled between a first n-type metal-oxide-semiconductor (NMOS) transistor of the first inverter and a ground terminal and between a second NMOS transistor of the second inverter and the ground terminal, the footer transistor to turn off during a pre-charge portion of a bit generation process.

Example 7 is the PUF circuit of Example 1, wherein, to write the second value to the bit node during the delay hardening mode, the control circuitry is to pass a voltage corresponding to the second value to the first pre-charge transistor via the first delay chain and is to pass a voltage corresponding to the first value to the second pre-charge transistor via the second delay chain.

Example 8 is the PUF circuit of any one of Examples 1 to 7, wherein the first and second delay chains are programmable delay chains, and wherein the PUF circuit further includes mask generation circuitry coupled to the first and second delay chains to: control the first and second delay chains to provide a series of different values of a differential delay between the first and second delay chains, wherein the PUF circuit is to perform a bit generation process for each value of the differential delay to generate respective output bits; determine a bias strength of the PUF circuit based on the output bits; and generate a dark bit mask based on the determined bias strength.

Example 9 is the PUF circuit of Example 8, wherein the mask generation circuitry is to mark the PUF circuit as a dark bit if the determined bias strength of the PUF circuit is below a threshold, and wherein the PUF circuit is forced to a pre-determined value or not used to generate an encryption code based on being marked as a dark bit.

Example 10 is the PUF circuit of any one of Examples 1 to 7, wherein, during a bit generation process of the PUF circuit, the first and second pre-charge transistors are turned on and then off, responsive to the clock signal, to generate an output bit, wherein the PUF circuit is to perform multiple instances of the bit generation process to generate respective output bits, and wherein the PUF circuit further comprises: a counter coupled to the bit node to count a number of the instances of the bit generation process for which the PUF circuit generates an output bit with a first logic value, wherein a value of the PUF bit associated with the PUF circuit is based on the counted number.

Example 11 is the PUF circuit of any one of Examples 1 to 7, wherein the first and second clock paths include a first metal layer that is coupled to a clock terminal to receive the clock signal, and wherein the bit node and the bit bar node are disposed in a second metal layer that is below the first metal layer.

Example 12 is the PUF circuit of Example 11, wherein the first and second clock paths are symmetrical.

Example 13 is a physically unclonable function (PUF) circuit comprising: a bit node and a bit bar node; a first inverter and a second inverter that are cross-coupled between the bit node and the bit bar node; a first pre-charge transistor coupled between the bit node and a power supply rail; a second pre-charge transistor coupled between the bit bar node and the power supply rail, the first and second pre-charge transistors to receive a clock signal via respective first and second clock paths; a programmable delay chain disposed on the first clock path; and mask generation circuitry coupled to the programmable delay chain. The mask generation circuitry is to: control the programmable delay chain to provide a series of different delay values on the first clock path, wherein the PUF circuit is to generate respective output bits associated with individual delay values of the series of delay values; and determine a bias strength of the PUF circuit based on the output bits.

Example 14 is the PUF circuit of Example 13, wherein the programmable delay chain is a first programmable delay chain, wherein the PUF circuit further includes a second programmable delay chain disposed on the second clock path, and wherein the mask generation circuitry is further to control the second programmable delay chain to provide a series of different delay values on the second clock path, wherein the PUF circuit is to generate respective output bits associated with individual delay values of the series of delay values on the second clock path.

Example 15 is the PUF circuit of Example 13, wherein the mask generation circuitry is to mark the PUF circuit as a dark bit if the determined bias strength of the PUF circuit is below a threshold, and wherein the PUF circuit is forced to a pre-determined value or not used to generate an encryption code based on being marked as a dark bit.

Example 16 is the PUF circuit of Example 13, wherein the bit node, the bit bar node, the first and second inverters, the first and second pre-charge transistors, and the programmable delay chain are included in a first PUF cell, and wherein the mask generation circuitry is to determine the bias strength for an array of PUF cells to generate a dark bit mask.

Example 17 is the PUF circuit of any one of Examples 13 to 16, wherein the first and second clock paths include a first metal layer that is coupled to a clock terminal to receive the clock signal, wherein the first and second clock paths are symmetrical, and wherein the bit node and the bit bar node are disposed in a second metal layer that is below the first metal layer.

Example 18 is a computing apparatus comprising: a clock terminal to receive a clock signal; a physically unclonable function (PUF) cell coupled to the clock terminal to receive the clock signal, the PUF cell to perform multiple instances of a bit generation process, responsive to the clock signal, to generate respective output bits at a bit node of the PUF cell; a counter coupled to the bit node to count a number of instances for which the output bit has a first logic value; and processing circuitry coupled to the bit node. The processing circuitry is to: determine that a value of a PUF bit associated with the PUF cell is the first logic value if the counted number is above a first threshold; determine that the value of the PUF bit is a second logic value if the counted number is below a second threshold that is less than the first threshold; and mark the PUF bit as a dark bit if the counted number is between the first and second thresholds.

Example 19 is the apparatus of Example 18, wherein the PUF cell further includes: a bit bar node; a first inverter and a second inverter that are cross-coupled between the bit node and the bit bar node; a first pre-charge transistor coupled to the bit node and to charge the bit node responsive to the clock signal; a second pre-charge transistor coupled to the bit bar node to charge the bit bar node responsive to the clock signal.

Example 20 is the apparatus of Example 19, wherein the PUF cell further comprises: a first delay chain disposed on a first clock path between the clock terminal and the first pre-charge transistor; a second delay chain disposed on a second clock path between the clock terminal and the second pre-charge transistor; and control circuitry to: if the processing circuitry determines that the value of the PUF bit is the first logic value, write the second logic value to the bit node during a delay hardening mode of the PUF cell to provide a differential delay between the first and second clock paths; and if the processing circuitry determines that the value of the PUF bit is the second logic value, write the first logic value to the bit node during the delay hardening mode of the PUF cell to provide a differential delay between the first and second clock paths.

Example 21 is the apparatus of Example 20, wherein the PUF cell further comprises: an enable terminal to receive an enable signal to switch the PUF cell between a bit generation mode and the delay hardening mode; a first negative-AND (NAND) gate having a first input terminal coupled to the clock terminal to receive the clock signal, a second input terminal coupled to the enable terminal to receive the enable signal, and an output terminal; a second NAND gate having a first input terminal coupled to receive an inverse of the enable signal, a second input terminal coupled to an output terminal of the flip-flop to receive an output signal, and an output terminal; and a third NAND gate having a first input terminal coupled to the output terminal of the first NAND gate, a second input terminal coupled to the output terminal of the second NAND gate, and an output terminal coupled to the first delay chain.

Example 22 is the apparatus of Example 21, wherein the PUF cell further comprises: a fourth NAND gate having a first input terminal coupled to receive an inverse of the enable signal, a second input terminal coupled to an output bar terminal of the flip-flop to receive an output bar signal, and an output terminal; and a fifth NAND gate having a first input terminal coupled to the output terminal of the first NAND gate, a second input terminal coupled to the output terminal of the fourth NAND gate, and an output terminal coupled to the second delay chain.

Example 23 is the apparatus of any one of Examples 19 to 22, wherein the first pre-charge transistor is coupled to the clock terminal via a first clock path, wherein the second pre-charge transistor is coupled to the clock terminal via a second clock path, wherein the first and second clock paths are symmetrical and include a first metal layer, and wherein the bit node and the bit bar node are disposed in a second metal layer that is below the first metal layer.

Example 24 is the apparatus of any one of Examples 18 to 22, wherein the PUF cell is a first PUF cell of an array of PUF cells, and wherein the processing circuitry is to determine the values for PUF bits associated with the array of PUF cells to generate an encryption code.

Example 25 is the apparatus of Example 24, wherein the clock terminal, the array of PUF cells, the counter, and the processing circuitry are included in an integrated circuit, and wherein the apparatus further includes a display and a memory coupled to the integrated circuit.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:
1. A physically unclonable function (PUF) circuit comprising:
   a clock terminal to receive a clock signal;

a PUF cell coupled to the clock terminal to receive the clock signal, the PUF cell to perform multiple instances of a bit generation process, responsive to the clock signal, to generate respective output bits at a bit node of the PUF cell; and a counter coupled to the bit node to count a number of instances for which the output bit has a first logic value, wherein a value of a PUF bit associated with the PUF cell is based on the counted number.

2. The PUF circuit of claim 1, further comprising processing circuitry coupled to the counter to:

determine that the value of the PUF bit is the first logic value if the counted number is above a first threshold; and determine that the value of the PUF bit is a second logic value if the counted number is below a second threshold that is less than the first threshold.

3. The PUF circuit of claim 2, wherein the processing circuitry is further to mark the PUF bit as a dark bit if the counted number is between the first and second thresholds.

4. The PUF circuit of claim 1, wherein the PUF bit corresponds to a most significant bit of the counter.

5. The PUF circuit of claim 1, wherein the counter is a 4-bit counter.

6. The PUF circuit of claim 1, wherein the PUF cell further includes:

a bit bar node;

a first inverter and a second inverter that are cross-coupled between the bit node and the bit bar node;

a first pre-charge transistor coupled to the bit node and to charge the bit node responsive to the clock signal; and a second pre-charge transistor coupled to the bit bar node to charge the bit bar node responsive to the clock signal.

7. The PUF circuit of claim 6, wherein the PUF cell is switchable between a bit generation mode and a delay hardening mode, and wherein the PUF cell further comprises control circuitry to write a second logic value to the bit node during the delay hardening mode responsive to a determination that the value of the PUF bit is the first logic value.

8. The PUF circuit of claim 7, further comprising:

a first delay chain disposed on a first clock path between the clock terminal and the first pre-charge transistor; and a second delay chain disposed on a second clock path between the clock terminal and the second pre-charge transistor.

9. The PUF circuit of claim 6, wherein the first pre-charge transistor is coupled to the clock terminal via a first clock path, wherein the second pre-charge transistor is coupled to the clock terminal via a second clock path, wherein the first and second clock paths are symmetrical and include a first metal layer, and wherein the bit node and the bit bar node are disposed in a second metal layer that is below the first metal layer.

10. The PUF circuit of claim 1, wherein the PUF cell is a first PUF cell, and wherein the PUF circuit includes an array of PUF cells including the first PUF cell.

11. A physically unclonable function (PUF) circuit comprising a PUF cell that includes:

a first inverter and a second inverter that are cross-coupled between a bit node and a bit bar node;

a first pre-charge transistor coupled to the bit node, the first pre-charge transistor to receive a clock signal via a first clock path; and a second pre-charge transistor coupled to the bit bar node, the second pre-charge transistor to receive the clock signal via a second clock path;

wherein the first and second clock paths include a first metal layer that is coupled to a clock terminal to receive the clock signal, and wherein the bit node and the bit bar node are disposed in a second metal layer that is below the first metal layer.

12. The PUF circuit of claim 11, wherein the first and second clock paths are symmetrical.

13. The PUF circuit of claim 11, further comprising:

a first delay chain disposed on a first clock path between the clock terminal and the first pre-charge transistor; and a second delay chain disposed on a second clock path between the clock terminal and the second pre-charge transistor.

14. The PUF circuit of claim 13, wherein the PUF cell is switchable between a bit generation mode and a delay hardening mode, wherein the PUF cell is to generate a PUF bit during the bit generation mode that has a first logic value, and wherein the PUF cell further comprises control circuitry to write a second logic value to the bit node during the delay hardening mode, wherein the second logic value is an inverse of the first logic value.

15. The PUF circuit of claim 11, wherein the PUF cell further includes a first programmable delay chain on the first clock path and a second programmable delay chain on the second clock path, and wherein the PUF circuit further includes mask generation circuitry coupled to the first and second programmable delay chains to:

control the first and second programmable delay chains to provide a series of different values of a differential delay between the first and second delay chains, wherein the PUF cell is to perform a bit generation process for each value of the differential delay to generate respective output bits;

determine a bias strength of the PUF cell based on the output bits; and generate a dark bit mask based on the determined bias strength.

16. The PUF circuit of claim 11, wherein the PUF cell is to perform multiple instances of a bit generation process, responsive to the clock signal, to generate respective output bits at the bit node of the PUF cell, and wherein the PUF circuit further comprises:

a counter coupled to the bit node to count a number of the instances of the bit generation process for which the output bit has a first logic value, wherein a value of a PUF bit associated with the PUF cell is based on the counted number.

17. A computer system comprising:

a processor;

a memory;

a physically unclonable function (PUF) circuit coupled to the processor or the memory, the PUF circuit comprising:

a first inverter and a second inverter that are cross-coupled between a bit node and a bit bar node;

a first pre-charge transistor coupled to the bit node, the first pre-charge transistor to receive a clock signal via a first clock path;

a second pre-charge transistor coupled to the bit bar node, the second pre-charge transistor to receive the clock signal via a second clock path; and control circuitry to:

pass the clock signal to the first and second pre-charge transistors during a bit generation mode to generate a PUF bit at the bit node with a first value; and write a second value to the bit node during a delay hardening mode, the second value being a logical inverse of the first value.

18. The computer system of claim 17, wherein the PUF circuit further comprises:
a first delay chain on the first clock path; and
a second delay chain on the second clock path.

19. The computer system of claim 17, wherein the PUF circuit further comprises a clock terminal to receive the clock signal and an enable terminal to receive an enable signal to switch the PUF circuit between the bit generation mode and the delay hardening mode, and wherein the control circuitry includes:
a first negative-AND (NAND) gate having a first input terminal coupled to the clock terminal to receive the clock signal, a second input terminal coupled to the enable terminal to receive the enable signal, and an output terminal;
a second NAND gate having a first input terminal coupled to receive an inverse of the enable signal, a second input terminal coupled to an output terminal of a flip-flop to receive an output signal, and an output terminal; and
a third NAND gate having a first input terminal coupled to the output terminal of the first NAND gate, a second input terminal coupled to the output terminal of the second NAND gate, and an output terminal coupled to the first clock path.

20. The computer system of claim 19, wherein the control circuitry further includes:
a fourth NAND gate having a first input terminal coupled to receive an inverse of the enable signal, a second input terminal coupled to an output bar terminal of the flip-flop to receive an output bar signal, and an output terminal; and
a fifth NAND gate having a first input terminal coupled to the output terminal of the first NAND gate, a second input terminal coupled to the output terminal of the fourth NAND gate, and an output terminal coupled to a second delay chain.

21. The computer system of claim 17, wherein, to write the second value to the bit node during the delay hardening mode, the control circuitry is to pass a voltage corresponding to the second value to the first pre-charge transistor via the first clock path and is to pass a voltage corresponding to the first value to the second pre-charge transistor via the second clock path.

22. The computer system of claim 17, wherein the PUF circuit further comprises:
a first programmable delay chain on the first clock path;
a second programmable delay chain on the second clock path; and
mask generation circuitry coupled to the first and second programmable delay chains to:
control the first and second programmable delay chains to provide a series of different values of a differential delay between the first and second programmable delay chains, wherein the PUF circuit is to perform a bit generation process for each value of the differential delay to generate respective output bits;
determine a bias strength of the PUF circuit based on the output bits; and
generate a dark bit mask based on the determined bias strength.

23. The computer system of claim 17, wherein, during a bit generation process of the PUF circuit, the first and second pre-charge transistors are turned on and then off, responsive to the clock signal, to generate an output bit, wherein the PUF circuit is to perform multiple instances of the bit generation process to generate respective output bits, and wherein the PUF circuit further comprises:
a counter coupled to the bit node to count a number of the instances of the bit generation process for which the PUF circuit generates an output bit with a first logic value, wherein a value of the PUF bit associated with the PUF circuit is based on the counted number.

24. The computer system of claim 17, further comprising a display and one or more antennas coupled to the processor.

* * * * *